United States Patent Office 3,219,629
Patented Nov. 23, 1965

3,219,629
COPOLYMERS OF SUBSTITUTED 1,3-DIOXEPINS
George B. Sterling, Midland, Mich., assignor to The Dow Chemical Company, Midland, Mich., a corporation of Delaware
No Drawing. Filed Jan. 3, 1961, Ser. No. 80,003
9 Claims. (Cl. 260—63)

The present invention relates to organic resinous materials, and is more particularly concerned with polymeric and copolymeric compositions of matter containing at least one substituted 1,3-dioxepin in chemically combined form, and with a method of making the same.

I have found that monomeric materials having the formula

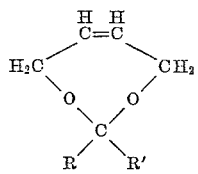

wherein R and R' represent individual members of the group consisting of alkyl and halosubstituted alkyl groups containing from 1 to 9 carbon atoms, alkenyl groups containing from 2 to 9 carbon atoms, hydrogen, aryl groups of the benzene series and R and R' collectively represent the divalent group

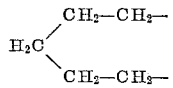

may be polymerized or copolymerized with other co-polymerizable monomers, using conventional mass, emulsion or suspension polymerization techniques to produce new polymeric and copolymeric materials which can be extruded or molded in usual ways employing conventional procedures to form shaped articles such as boxes, plates, or plastic tags. They can also be incorporated with other resinous polymers to form compositions useful in making shaped articles, e.g. cups, tags, rings, etc.

Substituted 1,3-dioxepins which are useful in making the polymeric materials of the present invention include, for example, 2,2-dimethyl-4,7-dihydro-1,3-dioxepin; 7,12-dioxaspiro-[5.6]-dodec-9-ene; 4,7-dihydro-1,3-dioxepin; 2-ethyl-2-methyl-4,7-dihydro-1,3-dioxepin; 2,2 - diethyl - 4,7-dihydro-1,3-dioxepin; 2-methyl-2-propyl-4,7 - dihydro-1,3-dioxepin; 2-methyl-4,7-dihydro-1,3-dioxepin; and the like.

These 1,3-dioxepins may be homopolymerized or copolymerized with other monomers such as vinyl aromatic compounds, i.e. styrene, dichlorostyrene, t-butyl styrene, vinyl xylene, vinyl toluene, and the like, acrylic and methacrylic acid esters such as methyl methacrylate, ethyl hexyl acrylate, ethyl acrylate, and the like, vinylidene chloride, vinyl chloride, acrylonitrile, methyl isopropenyl ketone, butadiene, mixtures thereof and the like. When binary copolymers are prepared advantageous products are obtained by copolymerizing from 5 to 80 weight percent of the substituted 1,3-dioxepin with, correspondingly, from 95 to 20 weight percent of the desired monomer. When ternary and quaternary copolymers are prepared advantageous products are obtained by copolymerizing desired mixtures containing from about 5 to about 50 weight percent of the 1,3-dioxepin.

The polymerization may be carried out in the usual manner using persulfate, peroxide, "azo" and the like catalysts in mass or emulsion polymerization and in the presence of conventional suspending or emulsifying agents such as, for example, sodium lauryl sulfate and the like.

The present invention is further illustrated by the following examples, but is not to be construed as limited thereto.

EXAMPLE 1

Mixtures of 110 grams water, 100 grams of mixed monomers, 0.85 gram of sodium lauryl sulfate, 1.0 gram each of sodium bicarbonate and tertiary dodecyl mercaptan, and potassium persulfate as shown in the following table, were polymerized at a temperature of 60° C., for the times and with the results shown in Table I. The crude products were steam distilled to remove unpolymerized monomer. In some cases, as shown in the table, an antioxidant was added. Aluminum sulfate was used to precipitate the polymer after which it was washed and dried. The resulting products had good elongation tensile and notched impact strength, and were readily molded into useful shapes and articles.

*Table 1*

| Run | 2,2-dimethyl-4,7-dihydro-1,3-dioxepin | Percent butadiene | Percent styrene | Percent methyl isopropenyl ketone | Percent ethyl acrylate | Percent Tert dodecyl mercaptan | Percent $K_2S_2O_8$ | Percent 2,4-dimethyl 6(1-methylcyclohexyl) phenol | Reaction time, hrs. | Percent conversion |
|---|---|---|---|---|---|---|---|---|---|---|
| 1 | 10 | 90 | | | | 1.0 | .75 | 3 | 24 | 90 |
| 2 | 20 | 80 | | | | 1.0 | .75 | 3 | 24 | 82 |
| 3 | 40 | 60 | | | | 1.0 | .75 | 3 | 24 | 42 |
| 4 | 50 | 50 | | | | 1.0 | .75 | 3 | 24 | 38 |
| 5 | 60 | 40 | | | | | .75 | 3 | 24 | 29 |
| 6 | 80 | 20 | | | | | .75 | 3 | 24 | 15 |
| 7 | 10 | 90 | | | | | .5 | 3 | 30 | 90 |
| 8 | 20 | 80 | | | | | .5 | 3 | 30 | 82 |
| 9 | 40 | 60 | | | | | .5 | 3 | 30 | 44 |
| 10 | 50 | 50 | | | | | .5 | 3 | 30 | 46 |
| 11 | 10 | | | | 90 | 1.0 | .75 | 3 | 24 | 90 |
| 12 | 20 | | | | 80 | 1.0 | .75 | 3 | 24 | 86 |
| 13 | 50 | | | | 50 | 1.0 | .75 | 3 | 24 | 24 |
| 14 | 10 | | | 90 | | | .75 | | 24 | 100 |
| 15 | 20 | | | 80 | | | .75 | | 24 | 80 |
| 16 | 30 | | | 70 | | | .75 | | 24 | 80 |
| 17 | 25 | | | 75 | | 1.0 | .75 | | 24 | 86 |
| 18 | 70 | | | 30 | | 1.0 | .75 | | 24 | 24 |
| 19 | 20 | | | | 80 | | .75 | | 24 | 99 |
| 20 | 50 | | | | 50 | | .75 | | 24 | 97 |
| 21 | 80 | | | | 20 | | .75 | | 24 | 30 |

One hundred parts of the copolymer from Run 1 were compounded with 40 parts carbon black, 5 parts zinc oxide, 2 parts sulfur, 3 parts benzothiazyl disulfide and 1 part stearic acid and cured at 292° F. for 30 minutes. The resulting product had the following physical properties:

Tensile strength _____p.s.i__ 460
Elongation _____percent__ 150
Permanent set _____do____ 3.0
Shore A hardness _____ 48.0
Shore C hardness _____ 7.5

An identical blend, except for using 100 parts of the copolymer from Run 2 and a curing time of 50 minutes at 292° F. gave a product with the following properties:

| | |
|---|---|
| Tensile strength _____p.s.i__ | 547 |
| Elongation _____percent__ | 200 |
| Permanent set _____do____ | 9.3 |
| Shore A hardness _____ | 45.0 |
| Shore C hardness _____ | 15.0 |

Injection moldings of the resinous products of Runs 14, 15 and 16 at 410–420° F. and 350 to 400 p.s.i.g. resulted in products having the following properties:

| Copolymer from Run | Tensile, p.s.i. | Elongation, percent | Notched impact |
|---|---|---|---|
| 14 | 2,800 | 3.15 | 0.9 |
| 15 | 2,950 | 3.15 | 0.9 |
| 16 | 3,100 | 4.2 | 0.578 |

EXAMPLE 2

In a manner similar to that of Example 1, 2,2-dimethyl-4,7-dihydro-1,3-dioxepin was homopolymerized and polymerized with varying weight percentages of other monomers as shown to produce polymeric products ranging from clear to opaque, insoluble in Skellysolve 100–140° C., soluble to insoluble in methyl ethyl ketone and toluene, and having good physical properties.

Table II

| Run | Second monomer | Weight percent | Percent conversion |
|---|---|---|---|
| 1 | Methyl methacrylate | 70 | 66 |
| 2 | ___do___ | 50 | 80 |
| 3 | Styrene | 95 | 92 |
| 4 | ___do___ | 20 | 50 |
| 5 | Methyl isopropenyl ketone | 95 | 90 |
| 6 | Vinylidene chloride | 95 | 94 |
| 7 | ___do___ | 75 | 72 |
| 8 | ___do___ | 50 | 52 |
| 9 | ___do___ | 25 | 36 |
| 10 | Ethyl hexyl acrylate | 70 | 76 |
| 11 | ___do___ | 50 | 60 |
| 12 | Ethyl acrylate | 95 | 94 |
| 13 | Vinyl toluene | 70 | 90 |
| 14 | ___do___ | 50 | 80 |
| 15 | Dichlorostyrene | 70 | 42 |
| 16 | ___do___ | 50 | 76 |
| 17 | Vinyl chloride | 50 | 18 |
| 18 | ___do___ | 75 | 42 |
| 19 | Acrylonitrile | 80 | 83 |
| 20 | ___do___ | 50 | 50 |
| 21 | ___do___ | 20 | 30 |
| 22 | Vinyl propionate | 80 | 94 |
| 23 | ___do___ | 50 | 42 |
| 24 | None (homopolymer) | | 20 |

EXAMPLE 3

Following the procedure of Example 1, ternary polymers were prepared with 2,2-dimethyl-4,7-dihydro-1,3-dioxepin and other monomers as shown in the following table. One hundred parts of the products were compounded with 40 parts carbon black, 5 parts zinc oxide, 2 parts sulfur, 3 parts benzothiozyl disulfide and 1 part stearic acid and then cured at 292° F. for 50 minutes. The physical properties given in the following table were taken on the compounded and cured products.

Table III

| Run | Monomers | Weight percent | Percent conversion | Tensile, p.s.i. | Percent elongation | Percent permanent set | Shore A hardness | Shore C hardness |
|---|---|---|---|---|---|---|---|---|
| 1 | Methyl isopropenyl ketone / Butadiene | 25 / 50 | 74 | 755 | 350 | 6.2 | 47 | 17 |
| 2 | Methyl isopropenyl ketone / Butadiene | 15 / 70 | 80 | 508 | 270 | 0 | 50 | 17 |
| 3 | Styrene / Butadiene | 25 / 50 | 52 | 898 | 400 | 3.1 | 45 | 15 |
| 4 | Styrene / Butadiene | 15 / 70 | 92 | 858 | 360 | 0 | 45 | 15 |
| 5 | Acrylonitrile / Butadiene | 25 / 50 | 78 | 1,010 | 340 | 0 | 55 | 20 |
| 6 | Acrylonitrile / Butadiene | 15 / 70 | 82 | 855 | 270 | 0 | 57 | 22 |
| 7 | Butadiene / Ethyl acrylate | 50 / 25 | 68 | 594 | 280 | 1.5 | 47 | 17 |
| 8 | Butadiene / Ethyl acrylate | 70 / 15 | 80 | 524 | 170 | 0 | 52 | 20 |
| 9 | Butadiene / Ethyl vinyl ether | 50 / 25 | 20 | 274 | 90 | 3.1 | 62 | 27 |
| 10 | Butadiene / Ethyl vinyl ether | 70 / 15 | 62 | 283 | 170 | 0 | 57 | 25 |
| 11 | Butadiene / Dichlorostyrene | 70 / 15 | 86 | 830 | 490 | 1.5 | 47 | 20 |

EXAMPLE 4

Following the procedure of Example 1 mixtures of 70 weight percent butadiene and 30 weight percent of various substituted 1,3-dioxepins were polymerized in the presence of 0.5 weight percent tertiary dodecyl mercaptan. The results are given in the following table.

Table IV

| Run | Monomer | Percent Conversion |
|---|---|---|
| 1 | 4,7-dihydro-1,3-dioxepin | 64 |
| 2 | 2-methyl-2-ethyl-4,7-dihydro-1,3-dioxepin | 60 |
| 3 | 2,2-diethyl-4,7-dihydro-1,3-dioxepin | 76 |
| 4 | 2-methyl-2-propyl-4,7-dihydro-1,3-dioxepin | 84 |
| 5 | 7,12-dioxaspiro-[5.6]dodec-9-ene | 98 |
| 6 | 2-ethyl-4,7-dihydro-1,3-dioxepin | 31 |
| 7 | 2-propyl-4,7-dihydro-1,3-dioxepin | 60 |
| 8 | 2-(3-butenyl)-2-methyl-4,7-dihydro-1,3-dioxepin | 71 |
| 9 | 2-bromomethyl-2-methyl-4,7-dihydro-1,3-dioxepin | 80 |
| 10 | 2-phenyl-4,7-dihydro-1,3-dioxepin | 77 |

These copolymers were soft-sticky materials insoluble in methyl ethyl ketone.

One hundred parts of the copolymers from Runs 6 through 13 inclusive were individually compounded with 40 parts Pelletex, 5 parts zinc oxide, 2 parts sulfur, 2 parts Captax and 20 parts of dibutyl sebacate and then cured at 292° F. for 40 minutes. The resulting products had the following physical properties.

Table V

| Copolymer from Run | 100% modulus | 300% modulus | Tensile, p.s.i. | Percent elongation | Percent permanent set | Shore A hardness | Shore C hardness |
|---|---|---|---|---|---|---|---|
| 6 | 158.0 | | 160 | 110 | 0 | 45 | 12 |
| 7 | 32.3 | 48.4 | 64.6 | 400 | 0 | 19 | 4 |
| 8 | 51.3 | | 67.0 | 110 | 0 | 29 | 6 |
| 9 | 0 | | 131.2 | 90 | 0 | 45 | 13 |
| 10 | 197.0 | | 229.0 | 130 | 0 | 49 | 16 |
| 11 | 110.0 | | 147.1 | 170 | 0 | 35 | 10 |

EXAMPLE 5

Mixtures of 20 weight percent 2,2-dimethyl-4,7-dihydro-1,3-dioxepin with other monomers were mass polymerized in the presence of two weight percent α,α-azobisisobutyronitrile at 60° C. for 30 hours. The results are indicated in the following table.

Table VI

| Run | Monomer | Weight percent | Percent conversion | Properties |
|---|---|---|---|---|
| 1 | Acrylonitrile | 80 | 66 | Hard, insoluble. |
| 2 | {Acrylonitrile / Styrene} | {40 / 40} | 88 | Do. |
| 3 | Ethyl acrylate | 80 | 100 | Soft, sticky rubber. |

Various modifications may be made in the present invention without departing from the spirit or scope thereof, and it is understood that I limit myself only as defined in the appended claims.

What is claimed is:

1. Organic polymeric products consisting essentially of copolymers of from 5 to 80 weight percent of a dioxepin having the formula

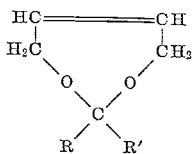

wherein R and R' represent individual members of the group consisting of alkyl and halosubstituted alkyl groups containing from 1 to 9 carbon atoms, alkenyl groups containing from 2 to 9 carbon atoms, hydrogen, aryl groups of the benzene series and R and R' collectively represent the divalent group

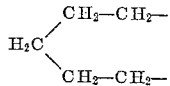

and correspondingly from 95 to 20 weight percent of a monomer selected from the group consisting of vinyl aromatic compounds, acrylic and methacrylic acid esters, vinyl and vinylidene chlorides, acrylonitrile, and mixtures of said monomers.

2. Product of claim 1 wherein the vinyl aromatic compound is styrene and the dioxepin is 2,2-dimethyl-4,7-dihydro-1,3-dioxepin.

3. Product of claim 1 wherein the dioxepin is 2,2-dimethyl-4,7-dihydro-1,3-dioxepin and the second monomer is butadiene.

4. Product of claim 1 comprising a copolymer of 2-ethyl hexyl acrylate and 2,2-dimethyl-4,7-dihydro-1,3-dioxepin.

5. Product of claim 1 comprising a copolymer of methyl isopropenyl ketone and 2,2-dimethyl-4,7-dihydro-1,3-dioxepin.

6. Product of claim 1 comprising a terpolymer of from about 15 to 25 weight percent 2,2-dimethyl-4,7-dihydro-1,3-dioxepin, about 15 to 25 weight percent styrene and from about 50 to 70 weight percent butadiene.

7. Product of claim 1 comprising a terpolymer of from about 15 to 25 weight percent 2,2-dimethyl-4,7-dihydro-1,3-dioxepin, 15 to 25 weight percent ethyl acrylate and about 50 to 70 weight percent butadiene.

8. A copolymer of butadiene and 2-(3-butenyl)-2-methyl-4,7-dihydro-1,3-dioxepin.

9. A copolymer of butadiene and 2-bromomethyl-2-methyl-4,7-dihydro-1,3-dioxepin.

References Cited by the Examiner

UNITED STATES PATENTS 2,578,861 12/1951 Thomas et al. _____ 260—88.3
2,870,097 1/1959 Pattison _____ 260—2

OTHER REFERENCES

Brannock et al.: Journal Organic Chemistry, vol 21, pages 1366–8 (1956).

Pattison: Journal Organic Chemistry, vol. 22, pages 622–4 (1957).

Strepikheev et al.: Chemical Abstracts, vol. 49, page 15860 (1955).

Skuratov et al.: Chemical Abstracts, vol. 52, page 12537 (1958).

LEON J. BERCOVITZ, *Primary Examiner.*

HAROLD N. BURSTEIN, JOSEPH R. LIBERMAN,
*Examiners.*